United States Patent [19]

Carroll

[11] Patent Number: 4,659,461
[45] Date of Patent: Apr. 21, 1987

[54] LIQUID SEPARATING APPARATUS

[76] Inventor: Noel Carroll, Sherbrooke Road, Sherbrooke 3789, Victoria, Australia

[21] Appl. No.: 702,239
[22] PCT Filed: Jun. 1, 1984
[86] PCT No.: PCT/AU84/00098
 § 371 Date: Jan. 28, 1985
 § 102(e) Date: Jan. 28, 1985
[87] PCT Pub. No.: WO84/04703
 PCT Pub. Date: Dec. 6, 1984

[30] Foreign Application Priority Data

Jun. 1, 1983 [AU] Australia .................. PF9645

[51] Int. Cl.$^4$ .............................................. B04C 3/04
[52] U.S. Cl. ..................... 210/104; 210/137; 210/512.2; 209/211
[58] Field of Search ............... 210/512.1, 512.2, 512.3, 210/744, 787, 104, 137, 799; 55/345, 346, 350; 209/144, 211; 73/61 R, 61.1 R, 61.4

[56] References Cited

U.S. PATENT DOCUMENTS

| | | | |
|---|---|---|---|
| 3,541,593 | 11/1970 | Waston | 210/512.2 |
| 4,148,723 | 4/1979 | Mozley | 210/512.2 |
| 4,168,231 | 9/1979 | Allen et al. | 210/512.2 |
| 4,276,119 | 6/1981 | Karnis et al. | 209/211 |
| 4,386,519 | 6/1983 | Sinkey | 209/211 |
| 4,464,264 | 8/1984 | Carroll | 210/512.1 |
| 4,519,848 | 5/1985 | Underwood | 210/512.1 |
| 4,587,024 | 5/1986 | Hayatdavoudi | 209/211 |

FOREIGN PATENT DOCUMENTS

| | | |
|---|---|---|
| 151513 | 5/1951 | Australia . |
| 708673 | 5/1954 | United Kingdom . |
| 773364 | 4/1957 | United Kingdom . |
| 912294 | 3/1982 | U.S.S.R. . |
| 927321 | 5/1982 | U.S.S.R. . |

Primary Examiner—Richard V. Fisher
Assistant Examiner—Wanda L. Millard

[57] ABSTRACT

Liquid separating device apparatus particularly for separating oil and water components from a mixture thereof. The apparatus includes a tank (50) for the liquid and two banks (62, 64) of cyclone separators for separating oil and water from the liquid in the tank. A control circuit (102) receives input from height sensors (180, 182, 184, 186) sensitive to the height of liquid in the tank (50). Circuit (102) is responsive to the sensed liquid height to vary the flow rate of liquid through the apparatus by varying the rate of operation of a pump (60) which pumps liquid from the tank (50) to the banks (62, 64), by controlling a valve (66) to direct the liquid either to one or to both the banks (62, 64) and to constrick flow from the banks (62, 64) by varying the resistance to flow through variable chokes (68, 70) which receive outflow from the banks.

1 Claim, 3 Drawing Figures

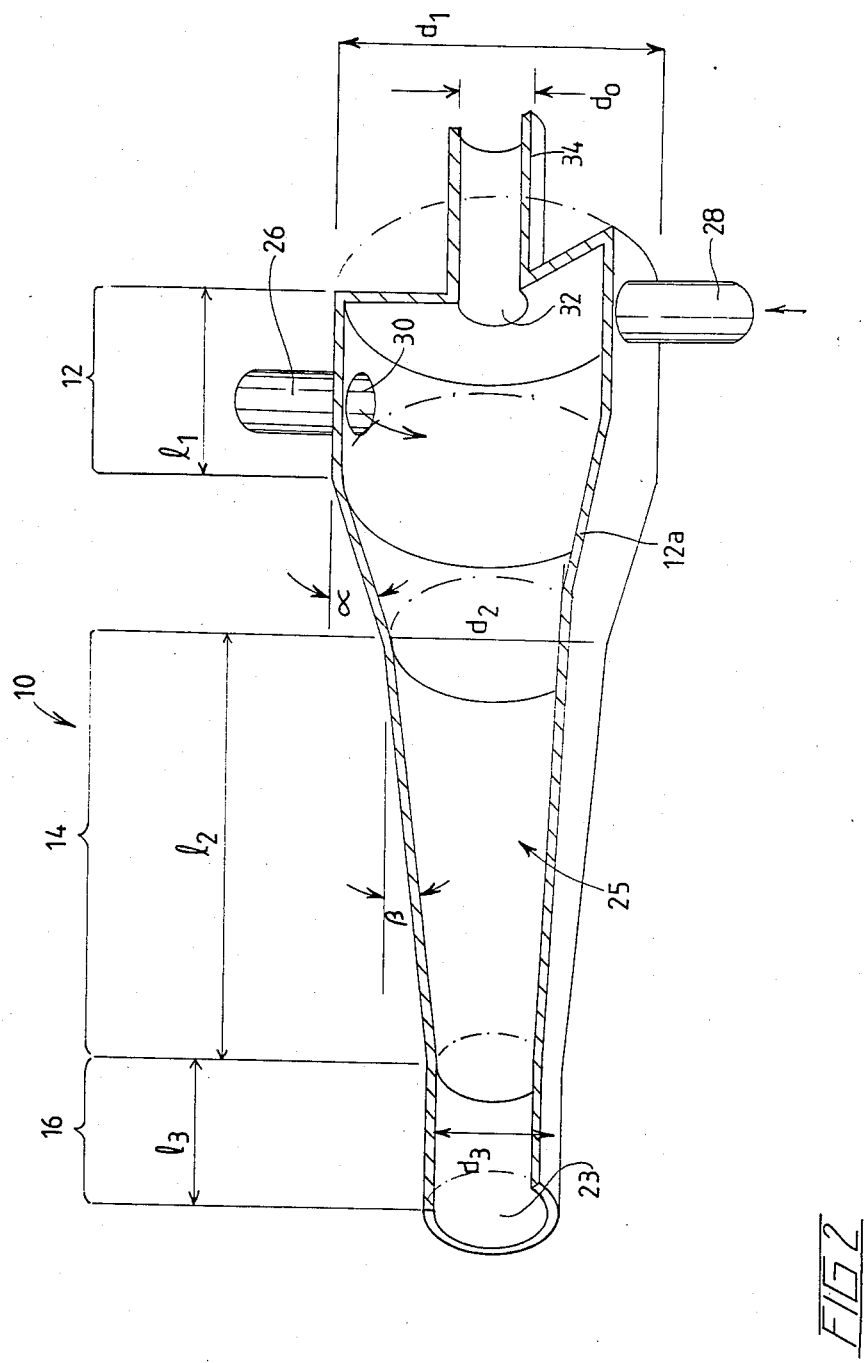

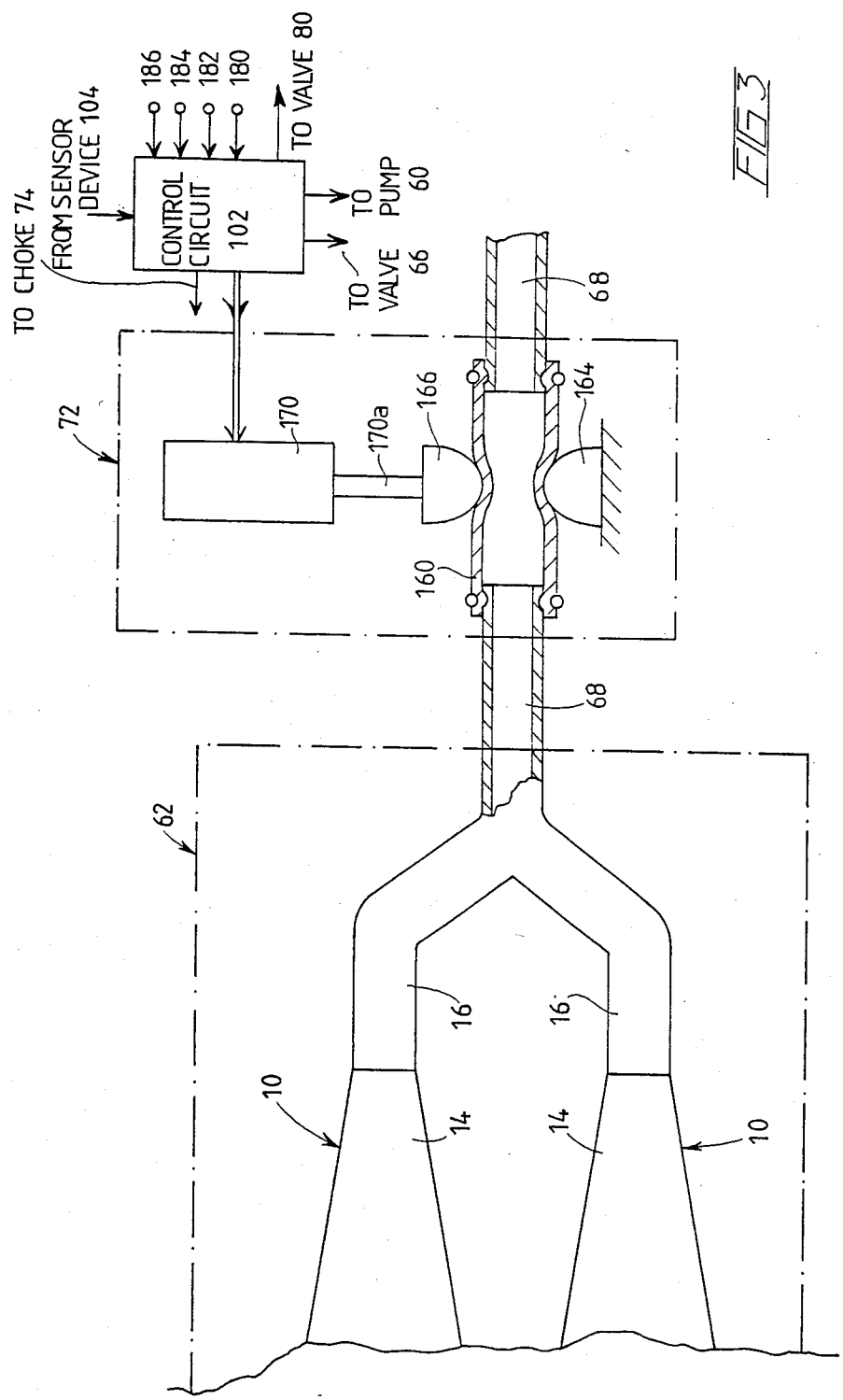

4,659,461

LIQUID SEPARATING APPARATUS

This invention relates to liquid separating apparatus particularly but not exclusively for separating oil from oily water.

Liquid separators, particularly cyclone separators, are sensitive to volumetric flow therethrough in that variation in such flow may cause loss of separator efficiency. An object of the invention is to provide separating apparatus adaptable to provide a variable liquid throughput whilst tending to maintain flow conditions suitable for efficient separation.

In accordance with one aspect of the invention there is provided liquid separating apparatus comprising a receptacle for liquid to be separated, and a plurality of liquid separators wherein regulating means is provided for effective selective variation of the delivery rate through said plurality of separators in accordance with the quantity of liquid in said receptacle. More particularly, it is preferred that means is provided for sensing said liquid level whereby to increase the said delivery rate on increase in said level. Said sensing means may comprise, for example, a plurality of sensors at different positions in said receptacle. Preferably the apparatus includes a pump for pumping liquid from said receptacle to said plurality of separators and said regulating means is effective to vary the pumping rate of the pump to increase the pumping rate on increase in said level as detected by said sensors. Said means may also operate to control valves between the said pump and the said plurality of separators whereby to effect said variation in delivery rate by controlling the number of separators to which the liquid is pumped from said pump. Said means may also comprise variable restriction means operable to selectively vary the restriction offered to flow from one or more of said separators to effect said variation. The separators may comprise cyclone separators.

The invention is further described with reference to the accompanying drawings in which:

FIG. 2 is a partly sectioned perspective view of a cyclone separator incorporated into the apparatus of FIG. 1; and FIG. 3 is a diagrammatic cross sectional view of the arrangement of a choke in a outlet line from a bank of cyclone separators included in the apparatus of FIG. 1.

Figure 1:
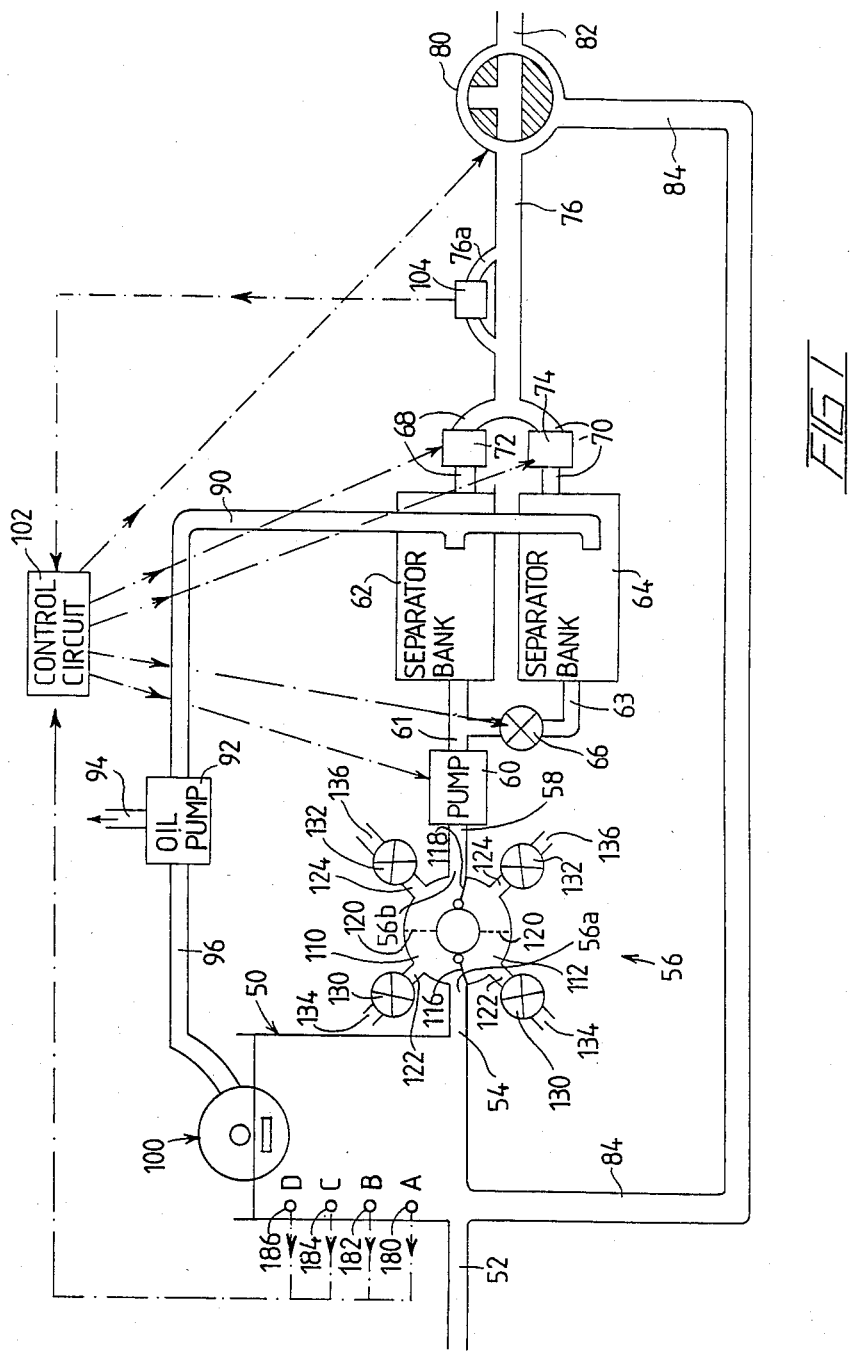
FIG. 1 is a diagram showing apparatus constructed in accordance with the invention.

The apparatus of FIG. 1 comprises a header tank 50 having a lower oily water inlet 52. A lower outlet pipe 54 from tank 50 communicates with a strainer device 56. Strainer device 56 has an outlet communicating via a pipe 58 with a piston pump 60. The outlet of the pump 60 is connected to the inlet of a bank 62 of cyclone separators by means of a pipe 61. A branch pipe 63 communicating with pipe 61 provides communication from the outlet of pump 60 to a second bank 64 of cyclone separators. A control valve 66 is positioned in pipe 63 and is selectively operable, for a purpose described later, to a condition at which free flow can occur through pipe 63 from pump 60 to bank 64 and to a condition at which such flow is precluded. Outlet pipes 68, 70 from the respective banks 62, 64 have variable flow restricting chokes 72, 74 positioned therewithin and provide flow communication to a pipe 76 which in turn provides fluid flow communication to a control valve 80. Valve 80 is controllable to allow flow from pipe 76 to an outlet 82 of the apparatus or, alternatively to prevent such flow and to divert the flow from pipe 76 through a return pipe 84 in fluid flow communication with tank 50 at a lower location therein.

A pipe 90 provides communication from separated oil outlets of the separator banks 62, 64 to an oil pump 92 operable to pump such separated oil to an oil outlet 94 of pump 92. Pump 92 also provides communication via a pipe line 96 with a skimmer device 100 positioned in tank 50 and operable to retrieve surface oil in the oily water in the tank. Such retrieved oil is pumped by pump 92 to outlet 94.

In normal operation, the pump 60 pumps oily water from tank 50 through device 56 to either or both of the separator banks 62, 64 such that separated water emerges from either or both of pipes 68, 70 and thence passes through the chokes 72, 74 to pipe 76 and thence through valve 80 to outlet 82, the valve 80 in this case being conditioned to permit through flow from pipe 76 to outlet 82 and preclude flow from pipe 76 to pipe 84. Separated oil is passed along pipe 90 to outlet 94.

Valve 80 is electrically controllable under control of a control circuit 102. Circuit 102 receives signal from an electronic oil content sensing device 104 arranged in a diverting pipe 76a through which a small portion of the flow through pipe 76 is diverted. Control circuit 102 operates, responsive to measured indications from the device 104 of oil content in water flowing through pipe 76, to either condition the valve 80 as described for normal operation or to condition the valve for diverting flow from pipe 76 through the valve 80 and through pipe 84 back to tank 50, so returning water to the tank for further separating action in the event that the measured oil content should exceed a predetermined level.

The device 56 comprises two branch pipes 110, 112 which each extend from an inlet 56a of the device to an outlet 56b of the device. Valves 116, 118 are arranged in the inlet 56a and outlet 56b respectively and one selectively operable so that flow from pipe 54 to pipe 58 through the device 56 either occurs along the branch pipe 110, as shown in FIG. 1, or alternatively occurs through the branch pipe 112. The branch pipe through which such flow does not occur for the time being is isolated from flow therethrough of oily water from pipe 54 via the valves 116, 118. Each branch pipe has a filter element such as a mesh 120 therein arranged to filter debris from the oily water admitted to the device so that such debris does not pass to the pump 60. The branch pipes 110, 112 each have a pair of ports 122, 124 therein positioned to opposite sides of the associated filter 120. These ports lead to control valves 130, 132 respectively. That one of the pipes 110, 112 which is for the time being being used to effect transfer of oily water from pipe 54 to pipe 58 has its ports 122, 124 closed by appropriate operation of the valve 130, 132. The other of the branch pipes 112, 114 can however be brought into communication via the respective valves 130, 132 with an associated fluid flow outlet pipe 134 or an associated fluid flow inlet pipe 136. Thus, by admission of fluid such as water to that pipe 136, flow can occur through the associated valve 132 and port 124 into the pipe 110 or 112 at the downstream side of the filter 120 to pass through the filter to clear accumulated debris on the filter by flow with that fluid back through the associated port 122, valve 130 and pipe 134.

The banks 62, 64 include a plurality of separators 10 which are of the form shown in FIG. 2. There may be any number of such separators arranged in series or in parallel or in series and parallel. For the purposes of the present explanation it is assumed that each bank however merely comprises two parallel separators 10.

The separator 10 shown in FIG. 2 has a separating chamber 25 having first, second and third cylindrical portions 12, 14 and 16 coaxially arranged in that order. These cylindrical portions are generally similar to the corresponding first, second and third cylindrical portions of the separating chamber of the cyclone separator described in U.S. Pat. No. 4,237,006, the disclosures of which are hereby incorporated into the present specification to form part thereof. Most particularly, the first cylindrical portion 12 has two feed pipes 26, 28 associated therewith, these being arranged to feed tangentially into the cylindrical portion 12 via respective inlet apertures of which only one aperture, namely aperture 30 associated with pipe 26, is visible in the drawing. The two feed inlet apertures are diametrically arranged one relative to the other and positioned close to the end of portion 12 remote from portion 14. The end of portion 12 remote from portion 14 also has a circular outlet opening 32 which leads to an overflow outlet pipe 34.

Cylindrical portion 12 is connected with cylindrical portion 14 via a part 12a of the separator which part 12a exhibits a taper towards the second cylindrical portion 14. As explained in U.S. Pat. No. 4,237,006 however, such tapered part is not essential.

The second cylindrical portion 14 exhibits a taper over its length, tapering from a diameter at the end adjacent part 12a equal to the diameter of part 12a at the junction between part 12a and portion 14 to a somewhat lesser dimension at its opposite end. Cylindrical portion 16 is a constant diameter equal to the minimum diameter of portion 14.

In the drawing, the length $l_1$ of portion 12, its diameter $d_1$, the taper angle $\alpha$ of the part 12a, the internal diameter $d_o$ of the outlet pipe 34, the length and diameter $l_2$, $d_2$ of the second portion 14, the taper angle $\beta$ of the second portion 14 and the length $l_3$ and diameter $d_3$ of the third cylindrical portion, as well as the total area $A_i$ of the two feed inlet apertures 30 may be selected in accordance with the parameters mentioned in U.S. Pat. No. 4,237,006. This is not essential however. For example the outlet diameter $d_o$ need not be constrained to be within limits as described in the U.S. patent.

In the above described exemplary instance where the two banks 62, 64 each comprise two parallel connected separators 10, the feed pipes 26, 28 of the separators of bank 62 are both connected to receive oily water from pipe 61 whilst those of the separators in bank 64 are connected to receive oily water from pipe 63. The overflow outlets 34 of the two separators in bank 62 and of the two separators in bank 64 are connected directly to pipe 90. The outlets 23 from the third cylindrical portions 16 of the separators 10 in bank 64 are connected as shown in FIG. 3 to the pipe 68 whilst those of the separators in bank 64 are connected to pipe 70 in an analogous manner to that shown in FIG. 3.

The chokes 72, 74 are identical and the following description of the choke 72 is applicable to each.

Referring now particularly to FIG. 3, the choke 72 comprises a flexible walled tube 160 which is inserted into pipe 68 so that liquid admitted to the end of pipe 68 at the inlet end thereof must pass through tube 160 when flowing to the valve 80. Choke 72 also includes two opposed elements 164, 166 one to either side of the tube 160. Element 164 is fixed but element 166 is movable towards and away from element 64, being connected to a plunger 170a of a solenoid 170. Solenoid 170 is operated under control of control circuit 102 so as to variably position the element 166 relative to the element 164. On the one hand, the element 166 may be moved to a position at which it is closely adjacent element 164 so as to compress the wall of tube 160 between the elements 164, 166 to effect a substantial constriction in the cross sectional area of the tube 160 whereby to effect a substantial constriction of flow through the pipe 68. On the other hand, the element 166 may be moved under control of circuit 102 to a position further away from the element 164 whereby to effect a lesser degree of compression of the tube 160 between the elements whereby to offer less resistance to liquid flow through pipe 68.

In addition to controlling the chokes 72, 74, the control circuit 102 also effects control of pump 60 and of valve 66. Insofar as pump 60 is concerned, the circuit 102 operates to vary the pumping rate of the pump 60. Insofar as the valve 66 is concerned, the circuit 102 operates to control the valve either to the aforementioned state at which flow is permitted only through pipe 61 with pipe 63 being closed or to the aforementioned state at which liquid flow from the pump 60 can occur via pipe 61, 63 to both banks 62, 64.

The control of the pump 60, valve 66 and chokes 72, 74 is effected in accordance with the signals provided from four sensors 180, 182, 184, 186 arranged at respective different heights "A", "B", "C", and "D" in tank 50. Sensor 180 is lowermost and is responsive to wetting thereof by liquid in tank 50, when that liquid rises to the level of sensor 180, to provide a signal to control circuit 102 indicative that the level of the liquid in the tank has risen from a level below the sensor 180 to the level of that sensor. Likewise, the sensors 182, 184, 186 provide signal information indicative of when the liquid level has risen from locations below these sensors to the respectively progressively higher levels "B", "C" and "D".

Generally, control circuit 102 may operate to open valve 66 and permit flow to both separator banks 62, 64 under conditions when there is a high liquid level in tank 50 and to close the valve so as to operate only bank 62 when there is a low level of liquid therein. Control circuit 102 may also generally operate to increase the speed of operation of pump 60 and thus the delivery rate therefrom under a condition of detected increased in liquid height. Likewise, the circuit 102 may operate to control the chokes 72, 74 whereby to decrease the flow through the respective pipes 68, 70 under conditions where there a low level of liquid in tank 50 and to increase the flow rate under conditions where there is a high level of liquid in tank 50.

While the exact form of the regime of control will vary in accordance with desired operating parameters and design parameters such as the number of banks of separators and the number and mode of interconnection of separators within, the banks the following operating regime has been found satisfactory in an experimental installation:

1. The sensed level is below level A: pump 60 is inoperative.
2. The sensed level is above level A, but below level B: pump 60 is operated at a speed "S1", valve 66 is closed for supply of oily water only to bank 62, and chokes 72, 74 are operated to a condition of maximum design constriction of flow through the pipes 68, 70.

3. The sensed level is between levels B and C: pump 60 is operated at speed 2(S1) with valve 66 and chokes 72, 74 conditioned as in the case where the sensed level is between levels A and B.
4. The sensed level is between levels C and D: pump 60 is operated at speed 3(S1), valve 66 is opened whereby to deliver oily water to both banks 62, 64 and chokes 72, 74 are conditioned as for the case when the sensed level is between levels A and B.
5. The sensed level is above level D: pump 60 is operated at speed 3(S1), valve 66 is open and chokes 72, 74 are conditioned to provide a minimum design flow restriction through pipes 68, 70.

Thus, the control circuit 102 together with the sensors 180, 182, 184 and 186, the chokes 68, 70, pump 60 and valve 66 constitute a flow regulating means effective to vary the volumetric flow through the bank 62 and/or 64 in accordance with the secured height of liquid in tank 50.

It has been found that cyclone separators of the kind shown in FIG. 2 require, for efficient operation, that there should be some flow restricting means provided at the outlets 23 thereof. In the present instance, this flow restriction is provided by the chokes 72, 74 and/or if necessary by providing that the cross sectional area of the pipe 68 or 70 is in any event less that twice the cross sectional area of the outlets 23 of the two separators to which it is connected. In case where there are more than two parallel separators in each bank or where there are series interconnected separator in each bank, however, the flow restriction may be provided for by other means. For example, where there are series connected separators, each separator which is immediately downstream of a relatively upstream positioned separator may itself provide sufficient flow restriction for the immediately upstream separator without interposition of any particular flow restricting means. If not, steps may be taken to provide such flow restriction in other ways.

Whilst the described arrangement has been described with reference to one employing four sensors for sensing four distinct levels of filling of the tank 50, it may obviously be adapted to arrangements where more than or less than four such steps are separated. Likewise although only two separator banks 62, 64 are provided in the apparatus described, the invention may readily be adapted to arrangements where there are more than two such banks.

It is preferred that the pump 60 be of a positive displacement type whereby the flow rate can be accurately varied by varying the speed of operation thereof, although this is not absolutely essential. Most particularly, I prefer to use a piston pump. The described means of varying the constriction provided by the chokes 72, 74 may also be varied. In principle any means for varying the effective cross sectional area presented to flow through the pipes 68, 70 may be provided, such as by use of needle valves or the like.

The sensors 180, 182, 184 and 186 may comprise conventional electronic sensing devices operable to vary the electrical state, such as the conductivity when subjected to contact with liquid. Control circuit 102 may likewise be of conventional form having a logic circuit responsive to the particular combination of actuated ones of the sensors 180, 182, 184 and 186 to effect desired operational combinations of pump speed and choke effectiveness and to operate valve 66. Valve 66 may be a conventional solenoid valve. Circuit 102 may operate solenoid 170 by providing variable voltage to the winding thereof to vary the force applied by the plunger 170a against a resilient biasing element such as a spring, whereby the extension of the plunger is proportional to applied voltage. Sensor 104 may also comprise a conventional electronic sensor operable to vary its electrical state on exceeding of a predetermined oil content in liquid contacting the sensor. Value 80 may be a conventional solenoid valve.

The described construction has been advanced merely by way of explanation and many modifications may be made thereto without departing from the spirit and scope of the invention as defined in the appended claims.

I claim:

1. Liquid separating apparatus comprising a receptacle for liquid to be separated, a bank of cyclone separators, coupling means interconnecting said bank of cyclone separators with said receptacle, for flow therethrough of said liquid from the receptacle through the separators, for separating the liquid into components of differing densities, and regulating means for effecting selective variation of the delivery rate through said bank of separators in accordance with the quantity of liquid in said receptacle, said regulating means comprising:
 (a) valve means in said coupling means and operable to vary the number of said separators into which flow from the receptacle through the bank of separators is effected;
 (b) selectively variable choke means positioned to vary the flow of at least one of the separated components from at least one separator in said bank of separators;
 (c) controllable pump means in said coupling means from the receptacle to the bank of separators, said pump means being controllable to vary the flow rate through said coupling means;
 (d) at least first, second, third and fourth level sensors disposed to detect conditions where said liquid level is at least equal to respective progressively higher first, second, third and fourth levels in said receptacle, and;
 (e) control means operatively coupled to said sensors, pump means, valve means and choke means, said control means being effective in use to control said pump means, choke means and valve means whereby
  (i) when said liquid level is above said first level, but below said second level, the pump means is operated at a first speed whilst said valve means is controlled to block flow to at least a first separator included in said bank of separators and said choke means is conditioned to a first condition at which it is effective to provide a first relatively great constriction of flow from the bank separators,
  (ii) when said liquid level is between said second and third levels, the pump is operated at a second speed greater than said first speed, whilst said valve means and choke means are conditioned substantially in the same condition as when the liquid level is between said first and second levels
  (iii) when the liquid level is between said third and fourth levels, the pump means is operated at a third speed greater than said second speed, said valve means is conditioned so that said liquid is delivered to a number of said separators greater than is the case where said liquid level is between said first and third levels and said choke means is conditioned to said first condition thereof and, (iv) when said liquid level is above said fourth level, the pump means is operated at said third speed, said valve means is conditioned to substantially the same condition as when said liquid level is between third and fourth levels and said choke means is conditioned to a second condition at which it is effective to provide less restriction to flow from said at least one separator than when the choke means is in said first condition thereof.

* * * * *